Patented Jan. 3, 1928.

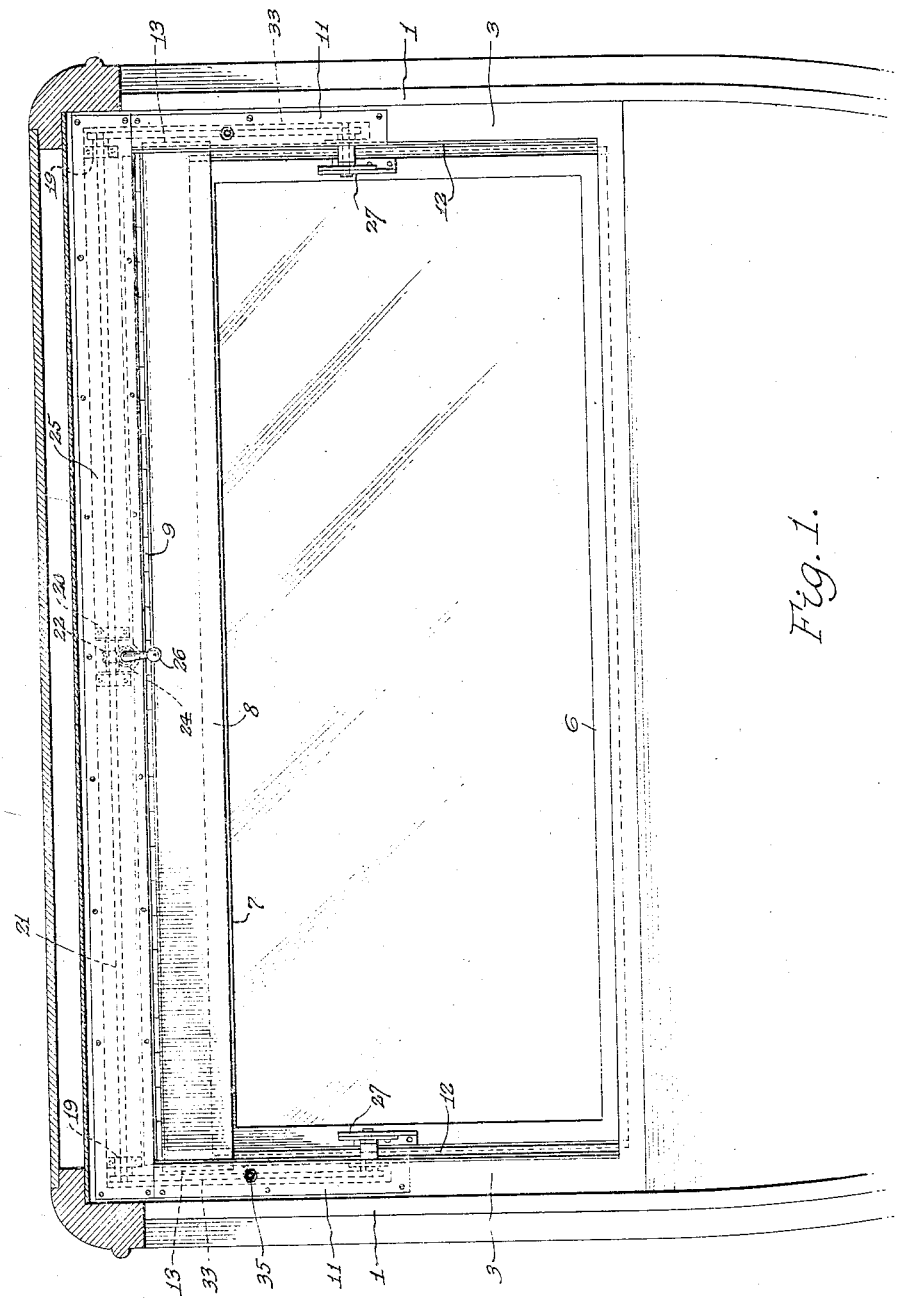

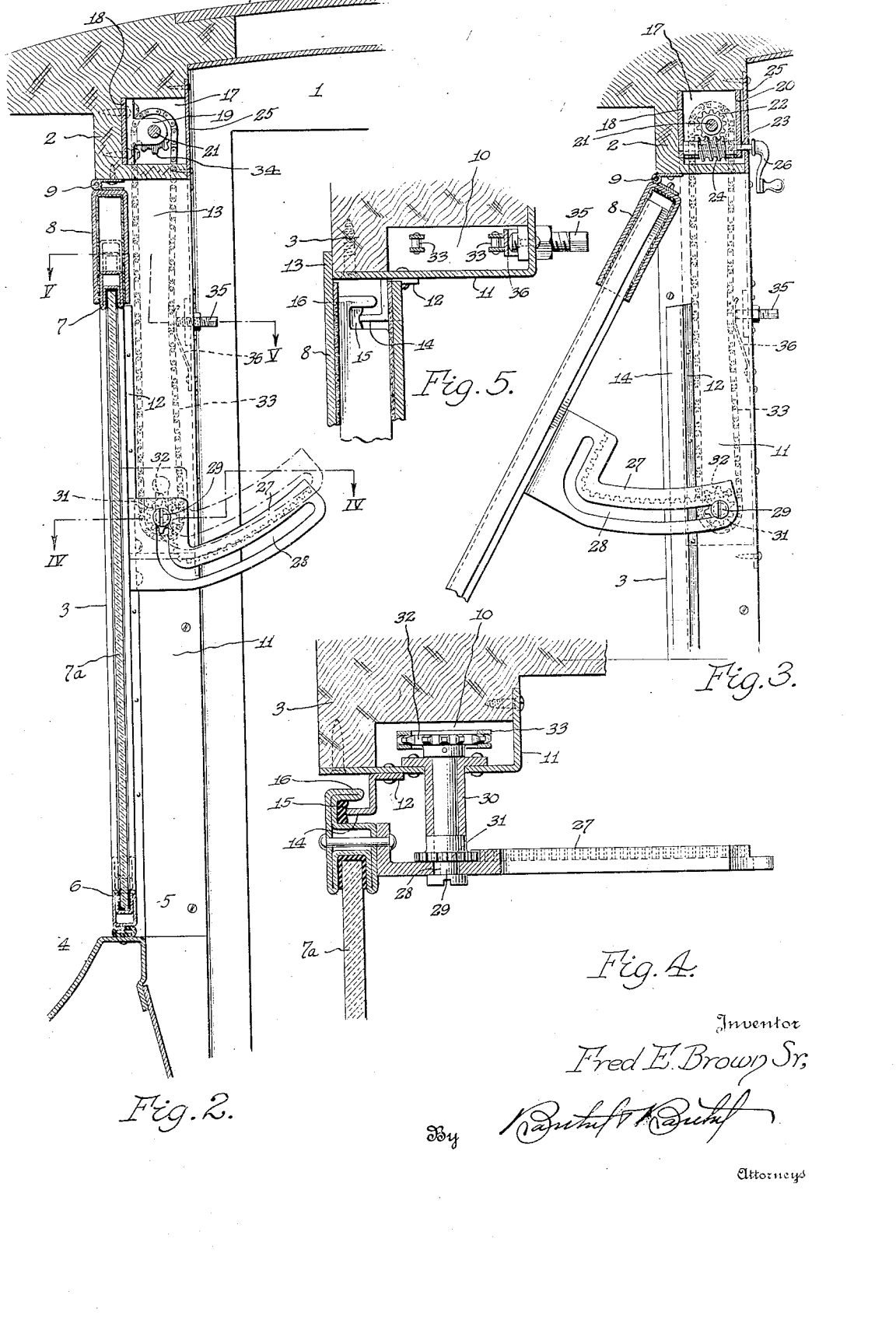

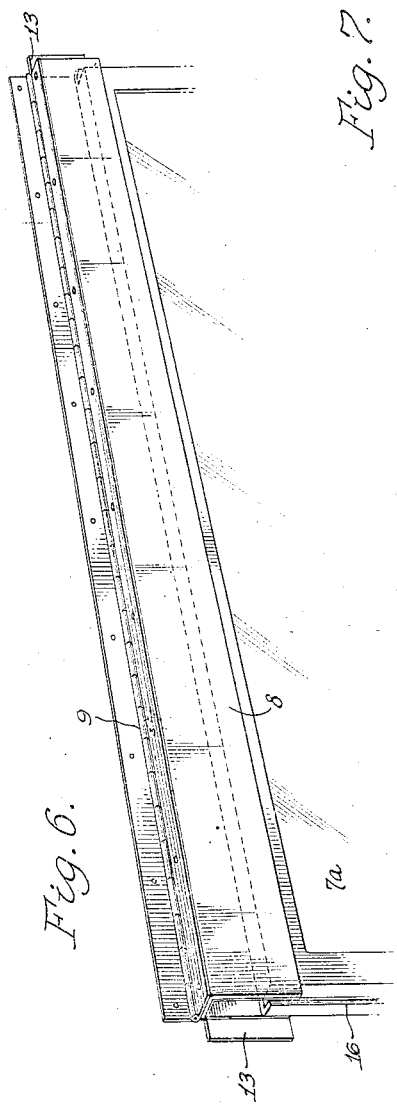
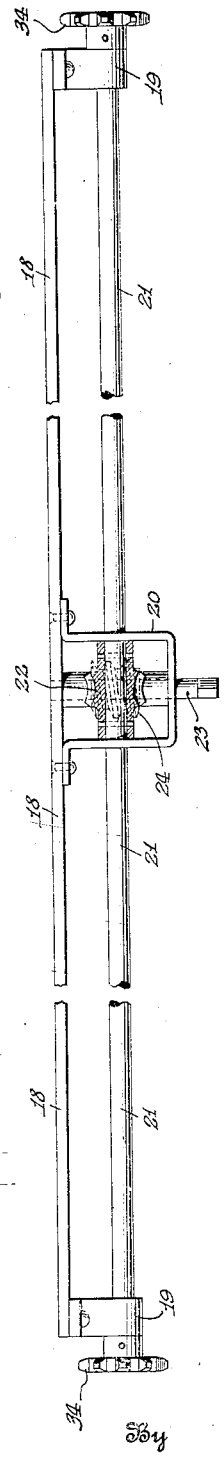
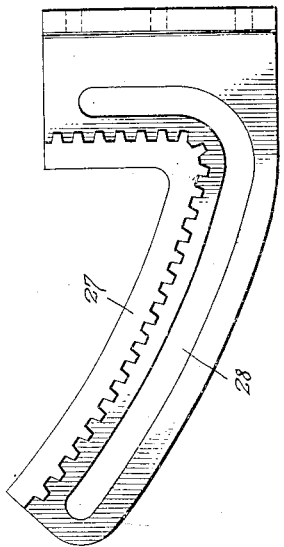

1,655,217

UNITED STATES PATENT OFFICE.

FRED E. BROWN, SR., OF DETROIT, MICHIGAN, ASSIGNOR TO JOSEPH N. SMITH COMPANY, OF DETROIT, MICHIGAN, A CORPORATION OF MICHIGAN.

VENTILATING WINDSHIELD.

Application filed December 18, 1925. Serial No. 76,195.

This invention relates to wind shields and has special reference to that class of windshields that may be adjusted for ventilating purposes. Many windshields now in use may have the lower part thereof adjusted to admit air to the body of the automobile, but a draft is produced and directed against the occupants of the front seats of the automobile and such draft is not at all desirable on account of the front seat occupants being exposed to the same. If the inlet of air can be directed upwardly into the automobile body it is much more desirable and a better circulation of air may be established in the automobile body.

My invention aims to provide a windshield that may be adjusted in two directions for a degree of ventilation in an automobile body, and when the windshield is opened the air is directed upwardly in the automobile body and over the heads of the front seat occupants whereby these occupants will not be exposed to a draft produced by operation of the automobile.

My invention further aims to provide a novel operating mechanism for an adjustable windshield, the windshield being arranged for vertical movement and swinging movement by the operating mechanism, the greater part of which is concealed in the top or body of the automobile.

A still further object of this invention is to provide an adjustable windshield and operating mechanism therefor that may be advantageously used in connection with closed body automobiles, the windshield and automobile body being constructed to afford substantial connections so that the elements cannot enter the automobile body when the windshield is closed. The construction also afford means of preventing windshield parts from rattling or becoming accidentally displaced, and with the greater part of the operating mechanism concealed the adjustable windshield will not detract from the finish or appearance of a high grade automobile body.

My invention will be better understood as the construction is described by the aid of the drawings wherein Figure 1 is a cross sectional view of an automobile body showing the inner side of the adjustable windshield;

Figure 2 is a vertical cross sectional view of the same on a large scale showing the windshield in a closed position;

Fig. 3 is another vertical cross sectional view of a portion of the windshield in an open position;

Fig. 4 is a horizontal sectional view taken on the line IV—IV of Fig. 2;

Fig. 5 is a similar view taken on the line V—V of Fig. 2;

Fig. 6 is a perspective view of a hinge casing forming part of the windshield;

Fig. 7 is a plan of a portion of the operating mechanism of the windshield, and

Fig. 8 is a detail view, in elevation, of an arcuated rack adapted to form part of the operating mechanism.

In the drawing, the reference numeral 1 denotes a portion of an automobile body or top having a windshield opening formed by a top rail 2, side rails 3 and a bottom rail or cowl 4, which is provided with a weather strip, cushion or stop member 5 for the windshield.

The windshield proper may be considered of conventional form including a frame 6 with a transparent plate 7ª therein, this plate being ordinarily glass, suitably supported in the frame 6, so that the windshield will form a front window of large area for the front end of the automobile body. The windshield frame 6 is the full width of the windshield opening, but of less depth than said opening, and the top rail 7 of the windshield frame extends into a lined transversely disposed hinged casing 8 mounted below the top rail 2 and attached thereto by a hinge 9, so that the casing 8 may be swung outwardly, as best shown in Fig. 3.

The side rails 3 of the automobile body or top 1 are cut away, at the upper ends thereof, to provide chainways 10 which are closed by side plates 11 attached to the rails 3 and approximately the full length thereof. These side plates are provided with stop flanges 12 for the windshield frame 7, said stop flanges terminating at the lower edge of the casing 8, and having vertical ribs 14 engageable by weather strips 15 mounted in outside channel portions 16 of the windshield frame 6, said windshield frame having its side rails constructed to provide the outside channel portions, as best shown in Fig. 4. When the windshield is closed the weather strips 15 seal the side edge of the windshield relative to the side rails 3 of the automobile top or body and with these same weather strips made of rubber or other yieldable material there will be a cushion for the windshield to prevent it from rattling during the operation of the automobile. The ends of the hinged casing 8 have outer wall extensions 13 which overlap the side rails 3 as best shown in Fig. 5, and cooperate with the flange 12 in excluding elements at the side edges of the windshield when closed.

The top rail 2 of the automobile body 1 is provided with a longitudinal recess 17 and suitably mounted therein is a plate 18 provided with bearings 19 and 20. Journaled in the bearings 19 and extending into the chainways 10 of the side rails 3 is a main operating shaft 21, which is provided with a worm wheel 22 at the bearing 20. Journaled in the bearing 20 and the plate 18 is an operating shaft 23 disposed at a right angle to the shaft 21 and provided with a worm 24 meshing with the worm wheel 22. The recess 17 is closed by a plate 25 through which the shaft 23 extends and has a crank 26 by which the shafts 23 and 21 may be rotated.

The side rails of the windshield frame 7, intermediate the ends thereof, are provided with inwardly projecting arcuated racks 27 having slots 28 and the greater part of each rack and slot is arcuated, while the lesser part is substantially parallel to the windshield and vertically disposed when the windshield is closed.

Extending into the slots 28 of the racks 27 are the outer ends of shafts 29 journaled in bearings 30 carried by the side plates 11 as best shown in Fig. 4. The shafts 29 have pinions 31 constantly meshing with the racks 27 and the inner ends of said shafts, within the chainways 10, are provided with sprocket wheels 32 under which are trained sprocket chains 33. In vertical alinement with the sprocket wheels 32 are sprocket wheels 34 on the ends of the shaft 21 and it is over these sprocket wheels 34 that the chains 33 are trained for transmitting power from the crank 26 to the pinions 31 and racks 27.

The side plates 11 are provided with chain tightening or tensioning devices that may include adjustable screws 35 engaging shoes 36 bearing against the chains 33. These chain tightening devices may be of a conventional form and may be eliminated when other forms of power transmission are substituted for the sprocket chain and wheel drive.

Assuming that the windshield is in a closed position, as shown in Fig. 2 and it is to be adjusted for ventilating purposes, the crank 26 is turned and the shaft 29 driven relative to the vertical portions of the racks 27. This will cause the racks to be raised with the bottom rail 6 leaving the weather strip 5 and the top rail 7 sliding in the casing 8. In some instances it may be only desirable to raise the windshield a short distance to admit air for ventilating purposes, but when it is desired to swing the windshield to avoid a draft, further rotation is imparted to the shafts 29 whereby the greater part of the racks 27 are brought into engagement with the pinions 31, causing the windshield 7ª and its casing 8 to bodily swing outwardly to a desired degree, as shown in Fig. 3.

With the crank 26 located at the top rail 2 of the body 1 it is out of the road, and does not interfere with an instrument board or other part of an automobile. Obviously the windshield and the operating mechanism may be proportioned for various types of automobiles, and it is to be further understood that the structural elements are susceptible to such changes as are permissible by the appended claims.

What I claim is:—

1. The combination of an automobile body or top having a windshield opening, a casing hingedly mounted in the windshield opening and extending longitudinally of said opening, a windshield having a top rail slidable in said casing, and operating means by which said windshield may be moved in said casing.

2. The combination called for in claim 1, further characterized by said means engaging said windshield at its ends and intermediate its top and bottom rails, said means being operatable to bodily move said casing and windshield.

3. The combination called for in claim 1, further characterized by said means extending longitudinal of the top of said windshield opening and downwardly at the sides thereof, said means being concealed within top and side rails of the automobile body.

4. The combination of an automobile body having a windshield opening, stop flanges carried by said body in the opening thereof, a longitudinally disposed casing hingedly connected to said body, a windshield having its upper edges slidable in said casing, weather strips carried by said windshield for engagement with said stop flanges, and operating means by which said windshield may be moved in said casing.

5. The combination called for in claim 4, further characterized by including arcuated racks and crank driven pinions.

6. The combination called for in claim 4, further characterized by said means being concealed in said automobile body about the opening thereof.

7. In an automobile, a windshield adapted to be swung outwardly, a hingedly supported means into which a portion of said windshield may slide preparatory to a swinging movement, means for sliding and swinging said windshield in sequence, and a common actuating device for said means.

8. A windshield adapted to be raised in a vertical plane to admit air under its lower edge, hingedly supported means housing the upper edge of said windshield and into which means said windshield may be raised, and means conditioned by raising said windshield adapted for swinging said windshield.

9. A windshield as called for in claim 8, wherein said means includes arcuated racks and crank driven pinions.

10. A windshield as called for in claim 8, wherein said means is operative to raise said windshield a predetermined height into said housing means and then operatable for swinging said housing means and said windshield.

In testimony whereof I affix my signature.

FRED E. BROWN, Sr.